United States Patent [19]

Ljungberg et al.

[11] Patent Number: 4,651,429
[45] Date of Patent: Mar. 24, 1987

[54] TOOL FOR MECHANICALLY MARKING AND MEASURING LENGTHS

[75] Inventors: Ture A. Ljungberg, Huddinge; Erik G. Bergdahl, Älvsjö, both of Sweden

[73] Assignee: T. A. Ljungberg Patent AB, Huddinge, Sweden

[21] Appl. No.: 846,628

[22] Filed: Apr. 1, 1986

[30] Foreign Application Priority Data

Apr. 16, 1985 [SE] Sweden ............................... 8501863

[51] Int. Cl.$^4$ .......................... G01B 3/10; B65H 75/16
[52] U.S. Cl. ...................................... 33/138; 242/84.8
[58] Field of Search ............... 33/138; 242/84.8, 107.2

[56] References Cited

U.S. PATENT DOCUMENTS 2,132,202  10/1938  Carlson .................................. 33/138
3,041,004   6/1962  Busch ..................................... 33/138
3,214,836  11/1965  West ...................................... 33/138
3,577,641   5/1971  Smith ..................................... 33/138
4,205,448   6/1980  Asai ....................................... 33/138

FOREIGN PATENT DOCUMENTS 859955  6/1954  Fed. Rep. of Germany ........ 33/138
882640 11/1961  United Kingdom ................. 33/138

Primary Examiner—Richard R. Stearns
Attorney, Agent, or Firm—Kurt Kelman

[57] ABSTRACT

The present invention relates to a device for locking in a set position along arched tape (5) preferably intended for measuring and marking. The tape is guided in a trough-shaped member (10) constituting one part of a locking mechanism and in which the tape is oriented with its convex side facing away from the bottom of the member. An elastically deformable locking member (17) constituting a second part of said locking mechanism has a part (16) displaceably disposed in a direction towards and away from the convex side of the tape guided in the trough. When the locking means is enabled, the part (16) has a radius of curvature substantially corresponding to that of the arched tape, and this radius of curvature may be different from the radius of curvature of the tape in the disabled state. The thin edges of the tape (5) will thus be urged against the corners of the trough, whereby an effective lock is obtained between the tape and the trough-shaped member in the region of the elastically deformable tape.

7 Claims, 9 Drawing Figures

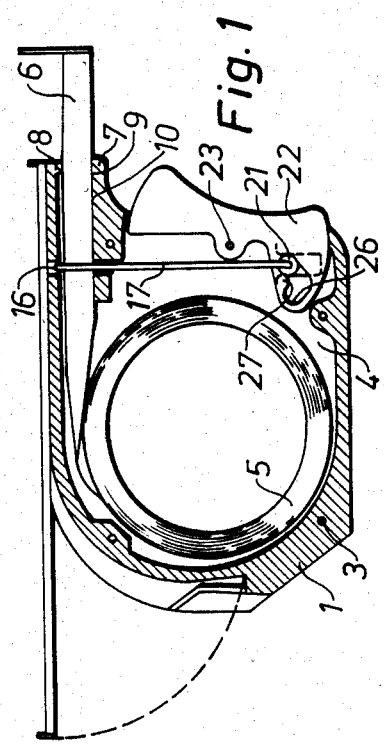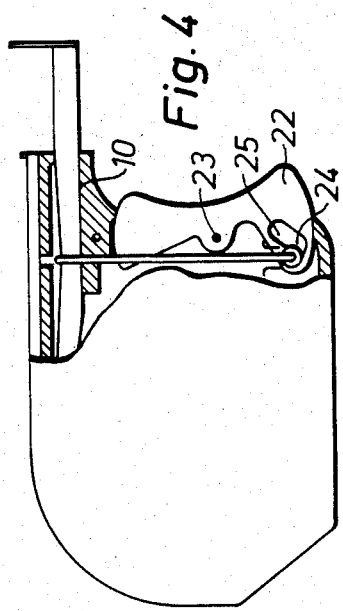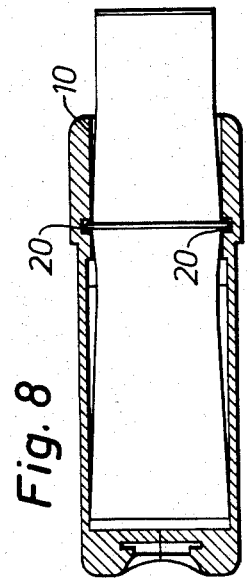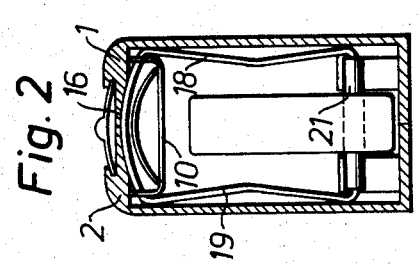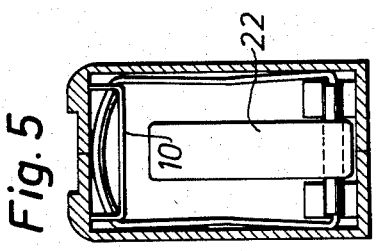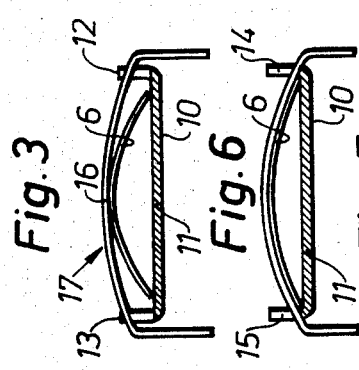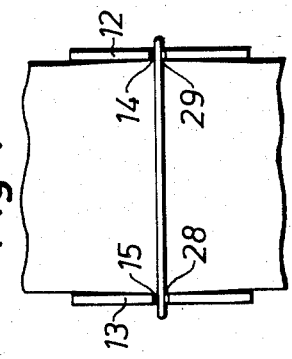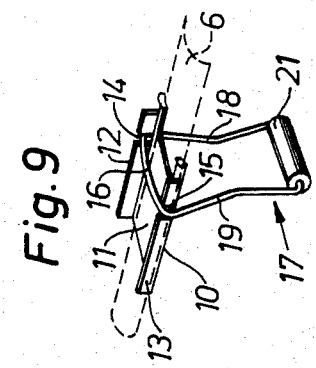

TOOL FOR MECHANICALLY MARKING AND MEASURING LENGTHS

The present invention relates to a locking device for a scale in a tool with combined length marking and measuring functions, where the scale is printed on an arched tape which may be coiled and is made of steel or other highly durable material. The tape is disposed in the form of a roll in a housing associated with the tool, from which the tape is withdrawable. Similar combination tools are known from Swedish patents Nos. 152.749 and 175.653.

In a tool in accordance with the invention, the measurement and marking out of lengths will be effected with the aid of combined measurement and scribing edges on the tool such that a length either set out on the tape scale or taken up at the measurement site according to the sliding gauge principle may be transferred to a workpiece with the aid of a scribe mark a desired number of times with unaltered accuracy and entirely independent of light and sighting availability. A requirement for unaltered accuracy in the laying-out of scribe marks on such surfaces having small surface finish, e.g. along the grain on wood, is an absolutely secure lock of the scale. With already known devices it has been found in practice that, particularly in respect of wide and heavily arched steel measuring tapes, it can be difficult to achieve sufficiently high friction between the tool and the tape to retain the latter in a set position, if it is also subjected to large tensional or compression forces.

The above mentioned disadvantages are surmounted with the locking device in accordance with the present invention. To achieve a secure lock for the scale on a coiled, arched or transversely convex steel tape or the like, it is proposed in accordance with the invention that a locking member is arranged displaceable in a direction towards the traversely convex side of the tape coil which is guided in a trough, and the locking member in an actuated, displaced state under resilience and simultaneous elastic deformation of the tape has a shape substantially agreeing with that of the elastically deformed tape, which may be different from the radius of the convex shape in the unlocked position.

In the mentioned displaced state, both outer edges of the tape in the region of the locking member are pressed against the corners of the trough which is formed by the bottom and edge flanges of the latter. There is thus obtained a secure lock of the tape, since the concentrated compression force between the thin edges of the tape and the corners of the trough can be so high that it also cuts through any oil film which may be present. To a certain extent there is also obtained a lock of the tape against the locking member due to the friction occurring between them, but this locking force is very small compared with the locking force occurring between the tape and the corners of the trough-shaped means.

The invention will now be described in detail with reference to the accompanying drawings, on which FIG. 1 is a longitudinal section of the tool with the steel tape in an unlocked state;

FIG. 2 is a cross section of the tool with the tape in an unlocked state;

FIG. 3 is a detailed enlargement in cross section of the locking device in accordance with the invention in an unlocked position;

FIG. 4 is a longitudinal section of the tool with the tape in a locked state;

FIG. 5 is a cross section of the tool with the tape in a locked state;

FIG. 6 is a detail enlargement in cross section of the locking device in accordance with the invention in a locked position;

FIG. 7 illustrates the locking device according to FIG. 6 seen from above;

FIG. 8 is a section of the tool according to FIG. 4 seen from above, and

FIG. 9 is a perspective view of the locking member and the trough-like guide means.

The embodiment of the tool illustrated in FIGS. 1 and 2 includes two flanged housing halves 1,2, joined to each other by unillustrated screws or the like at a number of places indicated by 3 in FIG. 1. A substantially circular space 4 is defined by the housing halves to accommodate a steel tape 5, rolled up into a roll, with its outer free end 6 projecting out from the housing through an opening in a portion 7 associated with, and somewhat extending from the housing. The ceiling 8 of the opening is defined by a transversely arcuate flange in the extended portion, the flange having a shape substantially matching the transversely convex shape of the tape 5. The bottom of the opening is defined by a flat support surface 9 for a trough-shaped member 10.

The width of the bottom of the trough-shaped member is somewhat greater than the width of the arched tape 5 but less than that of the flattened-out tape. As will be clearly seen from FIGS. 3, 6 and 9, the trough-shaped member, constituting one part of a locking mechanism, comprises a flat bottom part 11 and two vertical flanges 12 and 13. Each flange is provided with a groove 14 and 15 extending from the upper free end of the flange to the bottom part 11. The grooves form a guide for the upper transverse portion 16 of a spring-biassed locking means 17, constituting the second part of the locking locking means 17. As is most clear from FIG. 9, the mechanism comprises a locking member formed as a loop or stirrup having two spaced, vertically arranged sections or legs 18,19, which are connected by the upper transverse part 16. The part 16 is elastically deformable. In a rest position the part 16 may have any shape, i.e. it may be straight and parallel with the bottom part 11. The part 16 may also be curved, as illustrated, i.e. convex as seen from the upper side of the tape. Depending on the type of tape material, this convexity may be more or less adjusted to the convex shape of the tape. Accordingly, it may have a radius of curvature which is greater than the radius of transverse curvature of the tape 5 in the rest position of the part 16. On the other hand, if the part is made of a more flexible wire with a certain built-in elasticity, it may have a radius of curvature which is substantially as great as the radius of transverse of the tape 5 in the rest position of the part. The tape passes freely between the transverse part 16 and the trough-shaped member 10 as long as the locking member is not actuated. Legs 18,19 of the stirrup move in grooves 20 in the housing halves, which is apparent from FIG. 8, and at their lower end portions they are joined to a rolling or gliding member 21. So that the central part of the locking member will also be resilient, each leg 18,19 is bent inwards, as is apparent from FIGS. 2 and 9. When a more flexible wire is used as locking member, the legs thereof may have a certain degree of built-in elasticity. For operating the locking member, the tool is provided with an operating member 22 which is rotatably mounted in the housing at 23. The rolling or gliding member 21 is movably disposed in a V-shaped guide groove 24 in the operating member 22. Each leg of the V-shaped groove forms a groove portion 25,26.

Locking the tape takes place in the following manner. Starting from the unlocked state, FIGS. 1–3, the operating member 22 is oriented such that the rolling or gliding member 21 is situated in the upper groove portion 25. By applying a light pressure to the upper part of the operating member 22, it will turn about the shaft 23 and urge the roller member 21 downwards along the groove portion 25 over an abutment 27 between both groove portions and into the groove portion 26. This causes the locking member 17 to be pulled downwards and part 16 to be deformed together with the tape end 6, which is pressed downwards and outwards against the corners of the trough-shaped member 10 formed by the bottom part 11 and the flanges 12,13 in the area of the locking member, as illustrated in FIG. 7 at 28 and 29. The vertical sections 18 and 19 of the locking member are also deformed elastically against the bias of the bends, which is apparent from FIGS. 2 and 5. As is most clearly apparent from FIG. 6 part 16 is deformed as well as the tape end 6 so that their radius of curvature will be substantially the same. By the tape end being pressed outwards against the corners of the trough-shaped member in the region of the locking member, there is obtained greatly increased friction between the tape and the trough-shaped member. The result will be that under the action of friction and the trough-shaped member the tape will be locked so effectively that risk of the tape being moved from its position when the tool is used for measuring and/or marking is infinitesimal. During locking, the thin edges of the tape will cut through any oil film between the tape and the trough-shaped member so that the lubricating film will not effect the lock negatively.

The locking member in accordance with the invention can have a configuration other than the one described above. Thus, the member may have any other cross-sectional shape, e.g. rectangular. Instead of the legs of the locking member being connected at their lower portions by a gliding or rolling means, the legs may be directly connected to each other, either by bent sections or by each leg extending obliquely inwardly/downwardly from the lower part of the trough-shaped member so that both legs are connected with each other at an acute angle. Other types of operating member are also possible for actuating the locking member.

The invention is thus not to be regarded as restricted to the embodiment described above, but may be varied within the scope of the following claims.

We claim:

1. A device for locking a resiliently flexible tape of transversely convex shape in a set position, which comprises
    (a) a trough-shaped guide member including
        (1) a bottom part and
        (2) two flanges extending substantially perpendicularly from the bottom part and defining respective corners with the bottom part, the tape being oriented in the trough-shaped guide member with the convex side thereof facing away from the bottom part, and
    (b) a locking member having an elastically deformable part transversely spanning the trough-shaped guide member on the opposite side of the convex tape side, the tape being guided in the trough-shaped guide member between the bottom part thereof and the elastically deformable locking member part, the deformable locking member part being displaceable with respect to the tape guided in the trough-shaped member between a rest position and a locking position, the deformable locking member part being arranged to depress the resiliently flexible tape when displaced into the locking position and the depressed resiliently flexible tape and the elastically deformable locking member part having the same radius of curvature in the locking position to engage the depressed tape over the entire width thereof while the longitudinal edges of the depressed tape frictionally engage the corners of the trough-shaped member.

2. The locking device of claim 1, wherein the locking member has the form of a stirrup comprising two elongate legs joined at one of their ends by the elastically deformable part.

3. The locking device of claim 1, wherein the two stirrup legs are elastically deformable.

4. The locking device of claim 1, further comprising an operating member connected to the ends of the elongate stirrup legs opposite the one end for displacing the stirrup between the rest and locking positions.

5. The locking device of claim 4, further comprising a rolling member connecting the opposite ends of the elongate stirrup legs, the operating member engaging the rolling member.

6. The locking device of claim 1, wherein the radius of curvature of the depressed resiliently flexible tape and of the elastically deformable locking member part in the locking position is greater than the radius of curvature of the transversely convex tape in the rest position.

7. The locking device of claim 1, wherein the flanges of the trough-shaped member define grooves, the elastically deformable locking member part passing through the grooves and being guided therein during the displacement between the rest and locking positions.

* * * * *